(12) United States Patent
Chakrabarti et al.

(10) Patent No.: US 6,807,167 B1
(45) Date of Patent: Oct. 19, 2004

(54) LINE CARD FOR SUPPORTING CIRCUIT AND PACKET SWITCHING

(75) Inventors: Satyabrata Chakrabarti, Aurora, IL (US); Mishra Amitabh, Oak Brook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/520,557

(22) Filed: Mar. 8, 2000

(51) Int. Cl.⁷ .............................................. H04L 12/66
(52) U.S. Cl. ...................... 370/352; 370/357; 370/389; 370/401
(58) Field of Search ................................. 370/351, 352, 370/353, 354, 355, 356, 357, 389, 463, 419, 420, 421, 466, 467; 709/250

(56) References Cited

U.S. PATENT DOCUMENTS

| | | | | |
|---|---|---|---|---|
| 4,535,448 A | * | 8/1985 | Baxter et al. ................ | 370/364 |
| 5,058,111 A | * | 10/1991 | Kihara et al. ................ | 370/420 |
| 5,513,174 A | * | 4/1996 | Punj ............................ | 370/394 |
| 5,809,022 A | * | 9/1998 | Byers et al. ............ | 370/395.51 |
| 5,892,764 A | * | 4/1999 | Riemann et al. ............ | 370/401 |
| 5,920,546 A | * | 7/1999 | Hebert et al. ................ | 370/260 |
| 5,949,791 A | * | 9/1999 | Byers et al. ................. | 370/466 |
| 5,963,564 A | * | 10/1999 | Petersen et al. ............. | 370/503 |
| 6,055,238 A | * | 4/2000 | Tanabe et al. ............... | 370/398 |
| 6,154,465 A | * | 11/2000 | Pickett ........................ | 370/466 |
| 6,208,637 B1 | * | 3/2001 | Eames ........................ | 370/352 |
| 6,208,658 B1 | * | 3/2001 | Pickett ........................ | 370/401 |
| 6,289,025 B1 | * | 9/2001 | Pang et al. .................. | 370/458 |
| 6,331,981 B1 | * | 12/2001 | Harth et al. .............. | 370/395.1 |
| 6,343,074 B1 | * | 1/2002 | Pickett ........................ | 370/353 |
| 6,366,578 B1 | * | 4/2002 | Johnson ...................... | 370/353 |
| 6,396,849 B1 | * | 5/2002 | Sarkissian et al. .......... | 370/490 |
| 6,560,222 B1 | * | 5/2003 | Pounds et al. ............... | 370/353 |
| 6,567,399 B1 | * | 5/2003 | Schuster et al. ............. | 370/352 |
| 6,633,848 B1 | * | 10/2003 | Johnson et al. .............. | 704/277 |

\* cited by examiner

*Primary Examiner*—Wellington Chin
*Assistant Examiner*—Jamal A. Fox

(57) ABSTRACT

A line card for supporting both circuit switching and packet switching is provided. The line card interfaces asynchronous communications and synchronous communications using a ATM switch and a Synchronous to Asynchronous Converter-Time Slot Interchange (SAC-TSI) that allows TDM traffic to be routed into the ATM fabric of the ATM switch. The line card supports video, voice and data communications. The line card further supports ATM, ethernet and frame relay communications.

15 Claims, 1 Drawing Sheet

LINE CARD FOR SUPPORTING CIRCUIT AND PACKET SWITCHING

BACKGROUND OF THE INVENTION

The present invention relates generally to line cards for interfacing two telecommunication systems and more particularly, to a line card for supporting circuit switching and packet switching and for supporting high speed multimedia applications.

Electronic communication systems are quickly becoming essential to today's society. Current communication systems utilize a number of high speed communication formats. Packet based formats are becoming more and more popular. Both synchronous and asynchronous communications formats have been used in a variety of different applications. These communication formats include asynchronous transfer mode (ATM), ethernet and frame relay. Each of these formats have different protocols and, in current communication systems, require different transmission systems. Additionally, a significant portion of communications continue to be provided over plain old telephone services (POTS) or circuit based switching systems.

Complicating matters even more, different communication formats are used to support different multimedia applications. Multimedia applications may include voice communications, video communications and data communications. These high speed applications similarly require a number of dedicated transmission devices.

One of the electronic devices which are important to these communication systems are line cards. Line cards provide the interface between a transmission line or bus and other electronic devices, such as digital signal processors. Currently, line cards are also designed and manufactured to support specific types of communication formats and applications. Thus, service providers are unfortunately required to have dedicated line cards for specific applications. If service providers desire to add additional, higher speed services, they must acquire new line cards.

Accordingly, there is a need in the art for a line card for supporting circuit switching and packet switching applications and for supporting multimedia applications.

SUMMARY OF THE INVENTION

In accordance with an aspect of a present invention, a line card is provided with supports both circuit switching and packet data switching. The line card may comprise a multimedia circuit for supporting multimedia applications. The multimedia applications may comprise anyone or more of video, voice and data.

An interface circuit provides an interface between high speed applications, such as any of asynchronous transfer mode, ethernet and frame relay. The line card may comprise a conversion circuit for performing synchronous to asynchronous traffic conversion. The conversion circuit may be a synchronous to asynchronous converter-time slot interchange.

In accordance with another aspect of the present invention, a line card comprising a multimedia circuit for supporting multimedia applications; and a conversion circuit for converting synchronous traffic to asynchronous traffic is provided.

These and other features and advantages of the present invention will become apparent from the following detailed description, the accompanying drawing and the appended claims.

BRIEF DESCRIPTION OF THE DRAWING

The foregoing and other advantages of the invention will become apparent upon reading the following detailed description and upon reference to the drawing in which.

DETAILED DESCRIPTION OF THE INVENTION

Figure 1:
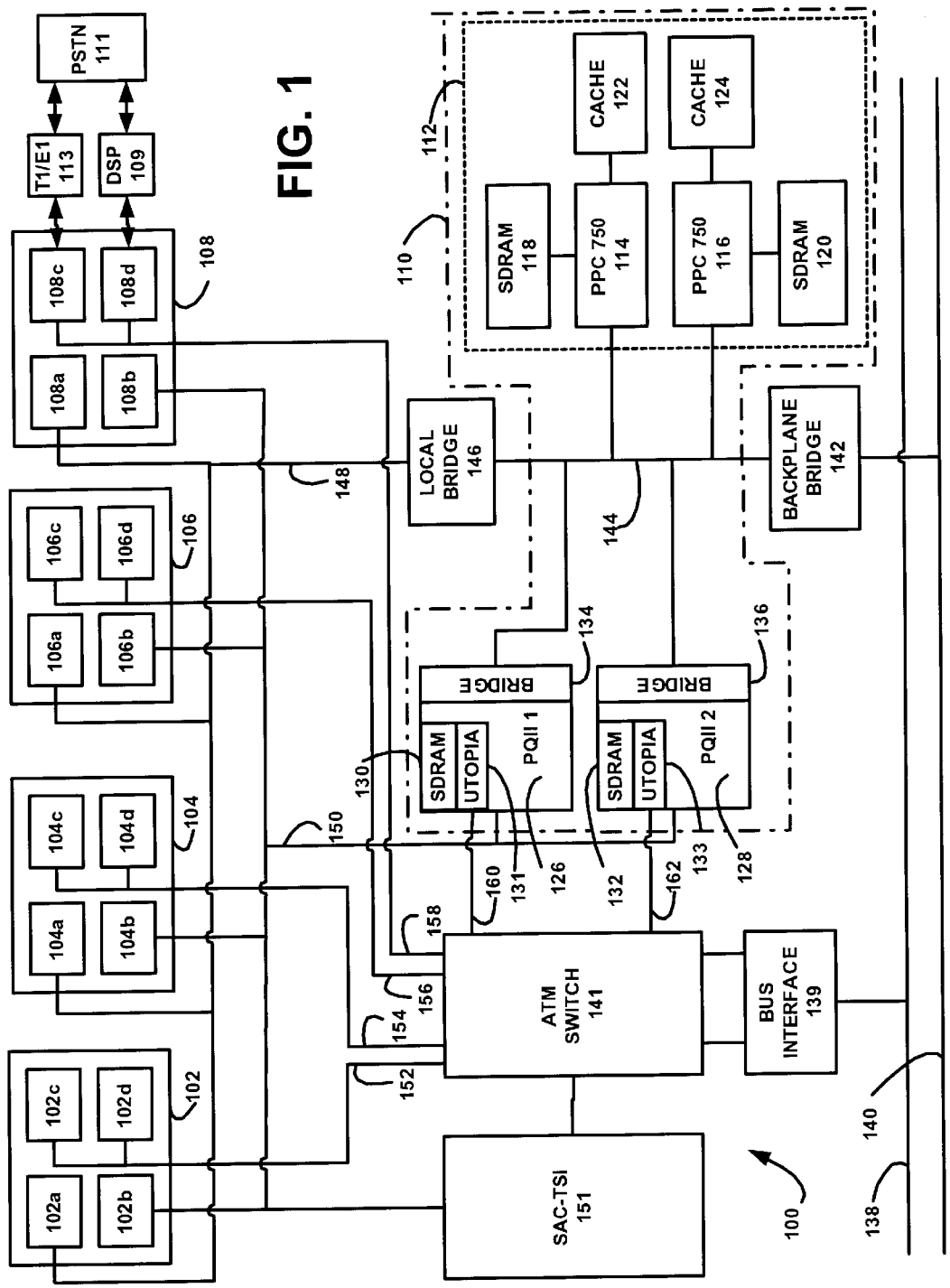
FIG. 1 is a block diagram of a line card in accordance with the present invention for supporting circuit and packet switching.

Referring now to FIG. 1, a line card 100, or intelligent carrier card, is shown in accordance with the present invention which supports both circuit switching and packet data switching. The line card 100 supports high speed multimedia applications, such as voice, video and data signals. The line card 100 is this able to address the needs of compute-intensive or protocol-intensive applications. The line card 100 advantageously provides customizable application functionality including, but not limited to, OC3/STM-1, channelized T1/E1, digital signal processing (DSP) and high-capacity network interface PMCs, such as 100baseFX ad SONET.SDH facilities. The line card of the present invention may be advantageously employed in communication hardware as disclosed in commonly assigned U.S. patent application Ser. No. 09/520,385, entitled "Hardware Configuration, Support Node and Method For Implementing General Packet Radio Services Over GSM", by Chakrabarti et al and filed concomitant with this disclosure, the disclosure of the co-pending application being hereby incorporated by reference, patent application Ser. No. 09/520,385 issued as U.S. Pat. No. 6,678,281 on Jan. 13, 2004.

For clarity and ease of description, the structure, control and arrangement of the conventional components and circuits have, for the most part, been illustrated in the drawings by readily understandable block representations and schematic diagrams, which show only those specific details that are pertinent to the present invention. These block representations and schematic diagrams have been employed in order not to obscure the disclosure with structural details which will be readily apparent to those skilled in the art having the benefit of the description herein.

The line card 100 provides a common asynchronous transfer mode (ATM), time domain multiplex (TDM) and processing resources for four sets, or slots, 102, 104, 106 and 108 of four PCI Mezzanine Cards (PMC) 102a–102d, 104a–104d, 106a–106d and 108a–108d. The PMC 108d is shown for exemplary purposes to be connected to a digital signal processor (DSP) 109 which is, in turn, connected to a public switched telephone network (PSTN) 111. Further, the PMC 108c is shown connected directly to the PSTN 111 through a T1/E1 interface card 113. As those skilled in the art will readily comprehend, the PMCs may be connected to any number of different devices. A processor configuration 110 provides computing power for the line card 100. The processor configuration 110 preferably includes a first, or main, processor group 112 comprised of first and second processors 114 and 116 connected to respective first and second memories 118 and 120, which are shown as high speed synchronized dynamic random access memories (SDRAMs). The first processor group 112 further includes a cache memory mechanism, shown as first and second backside Layer 2 (Link Layer) caches 122 and 124, associated with the respective first and second processors 114 and 116. Preferably, the first and second processors 114 and 116 are multimedia PC (MPC) PowerPC® processors manufactured by Motorola, Inc. located in Schaumburg, Ill.

The processor configuration 110 further comprises a second, or protocol, processor group comprised of first and second processors, or devices, 126 and 128, which are preferably PowerQUICC II (PQII), or Quad Integrated Communications Controller, devices manufactured by Motorola, Inc. The devices 126 and 128 have associated high speed memories, or SDRAMs 130 and 132 respectively, and respective bridges 134 and 136. The devices 126 and 128 contain a number of I/O interfaces including Universal Test and Operations Interface for ATM (UTOPIA) 131 and 133, TDM, serial and parallel interfaces. The devices 126 and 128 further have an integrated hardware ATM Segmentation And Reassembly (SAR) and Time Slot Interchange (TSI) functions. Within each device 126 and 128 is also a programmable Reduced Instruction Set Computing (RISC) protocol engine and a PowerPC® processor. The line card 100 may further have power converters for providing power to the respective components mounted thereon.

As discussed more fully below, the line card 100 includes a Synchronous to Asynchronous Converter-Time Slot Interchange (SAC-TSI) that allows TDM traffic to be routed into the ATM fabric, thus avoiding the need for a TDM bus in the backplane of the line card 100. The line card 100 includes an ATM bus 138 for supporting ATM communications and a compact Peripheral Component Interconnect (cPCI) bus 140 for supporting communications with peripheral components.

The ATM bus 138 is connected to a bus interface (BI) unit 139 which interconnects the ATM bus 138 with an ATM switch 141. The ATM switch 141 is preferably an Atlanta manufactured by Lucent Technologies, Inc. A backplane bridge 142 provides communications between the various elements comprising the line card 100 and the ATM and cPCI busses 138 and 140. A central bus 144 interconnects the backplane bridge 142 and the processor configuration 110.

A local bridge 146 is connected to the central bus 144 and provides communications to and from a local PCI bus 148 which is connected to the four sets 102, 104, 106 and 108 of PMCs. A TDM bus 150, which may be a H.110 TDM bus, provides TDM communications between the devices 126 and 128, a SAC-TSI 151 and the four sets 102, 104, 106 and 108 of PMCs. The SAC-TSI 151 provides an interface between the TDM bus 150 and the ATM switch 141. Since the SAC-TSI 151 routes TDM traffic from the local PCI bus 148 into the ATM switch 141, there is no need for a TDM bus in the backplane of the line card 100.

The ATM switch 141 has first, second, third and fourth ATM output busses 152, 154, 156 and 158 connected to each of the four sets 102, 104, 106 and 108 of PMCs. First and second ATM switch busses 160 and 162 provide ATM communications between the ATM switch 141 and the respective first and second devices 126 and 128. The ATM switch 141 may be comprised of an ATM switch core based on a Atlanta Switch Fabric chipset sold by Lucent Technologies which provides the ATM switching between the backplane, the two devices 126 and 128 and the four sets 102, 104, 106 and 108 of PMCs.

A detailed discussion of the operation of the line card 100 and its components will now be provided. In a general basic principle of operation, the line card 100 provides data paths and processing resources on top of which application hardware and software can be located. The PMC slots 102, 104, 106 and 108 provide the flexibility to populate the line card 100 with additional hardware specific to the needs of a particular application. Each PCM slot 102, 104, 106 and 108 has full access into each of the major internal data paths, such as ATM, H.110, cPCI bus and central bus, of the line card 100. The PMC slot configuration may be implemented to take advantage of this design flexibility.

Along with support for available PMC-compatible cards, the PMC cards may be implemented for channelized T1/E1 PMC, ATM T1/E1 PMC, OC3/STM-1 PMC, DSP PMC, fast ethernet with PowerQUICC PMC and channelized STS-1 PMC. As noted, the ATM switch 141 may be implemented as part of the Atlanta Switch Fabric chipset. In particular, the ATM switch 141 may be implemented as the portion of the Atlanta Switch Fabric chipset known as an Atlanta Layer Manager/Atlanta Buffer Manager (ALM/ABM) plus supporting logic. This implementation provides the functional equivalent of an ATM switch with OC-12 class aggregate bandwidth to the PMC slots, both devices 126 and 128 and the SAC-TSI 151. As will be apparent to those skilled in the art, the ATM switch 141 may span across multiple line cards.

The H.110 TDM bus 150 may be a standard 4096 (unidirectional) slot TDM bus designed to carry constant bit rate (CBR) traffic. Access is available to it form each PMC slot 102, 104, 106 and 108, both devices 126 and 128 and the SAC-TSI 151. The SAC-TSI 151 is a hardware-accelerated solution for carrying TDM-style traffic over ATM. The SAC-TSI 151 provides a bridge between the asynchronous ATM domain and the synchronous TDM domain. This permits TDM traffic to travel between different line cards via encapsulation over ATM through the ATM switch 141. No processor resources are used in sustaining the traffic across the SAC-TSI 151.

The processors 114 and 116, or main processor, is the central point of control for the line card. The main processor has direct access to the control path for all other onboard resources including the ability to see the contents of the memories 118 and 120 and full access to the PMC slots 102, 104, 106 and 108. Preferably, the memories 118 and 120 associated with the processors 114 and 116 are 64 MB.

The PowerQUICC II devices 126 and 128 are specifically tailored for carrying traffic. The line card 100 has two of these devices 126 and 128 which are symmetric in their implementation, having full direct access to the ATM switch 141, the H.110 TDM bus 150 and the SDRAMs 118 and 120. Each of the devices 126 and 128 are coupled to separate banks of 64 MB memory. Each of the devices 126 and 128 also provides a Media Independent Interface (MII) to the backplane connector. The MII may be connected to an ethernet for certain applications. The PowerQUICC II devices 126 and 128 advantageously have an architecture which has significant on-chip hardware to accelerate several capabilities, such as hardware support for HDLC protocols and AAL2 and AAL5 over ATM.

An exemplary procedure for processing voice communications will now be described. The frames of the voice communications arrive on the ATM bus 138 from an external network. Typically, these frames may be of type AAL2 using ATM as a transport. The BI unit 139 converts the frames into a format compatible with the components on the line card 100. The UTOPIA bus 131 and 133 transfers the frames to the ATM switch 141. From the ATM switch 141, the frames move over the UTOPIA bus 131 and 133 to the serial interface which is part of the communications processor module (CPM) of the PowerQUICC II device 126 and 128. The serial interface then transfers the frames over the cPCI bus 140 using FCC channels to the RISC engine running micro-code. Micro-code converts the AAL2 frames into AAL0 format.

The RISC engine transfers the AAL0 frames over dedicated channels on the cPCI bus 140 to the memory caches 122 and 124 for processing by the processors 114 and 116. The processors 114 and 116 process the AAL0 frames and writes to the SDRAMs 118 and 120. The processors 114 and 16 may run in load shared mode and may perform frame selection or any other application level processing.

The processors 114 and 116 put the frames on the PPC bus 144 which pass through the local bridge 146 onto the local PCI bus 148. The DSP 109 connected to the PMC 108d performs EVRC processing on the frames and places the frames on the TDM bus 150. The frames are then transferred from the TDM bus 150, to the BI unit 139 to the ATM switch 141. The ATM switch 141 sends the frames to the T1/E1 interface card 113 using UTOPIA 131 and 133.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A line card comprising:
   a plurality of connection points for connecting to communication devices having a plurality of communication protocols;
   a first set of the plurality of connection points connected to a time division multiplex bus on the line card;
   a synchronous to asynchronous converter also connected to the time division multiplex bus;
   a processor group connected to the time division multiplex bus in order to control a flow of time division multiplexed information to and from the first set of connection points;
   a second set of the plurality of connection points connected to a PCI bus on the line card;
   a first bridge having a first port connected to the PCI bus on the line card;
   the first bridge having a second port connected to a central bus on the line card;
   the central bus connected to the processor group to control a flow of information to and from the PCI bus;
   the central bus connected through a backplane bridge to a connection point with a backplane PCI bus;
   a third set of the plurality of connection points connected to an asynchronous transfer mode output bus on the line card;
   the asynchronous transfer mode output bus connected to an asynchronous transfer mode switch on the line card;
   the asynchronous transfer mode switch connected through a bus interface to a connection point with a backplane asynchronous transfer mode bus;
   the asynchronous transfer mode switch connected to the synchronous-asynchronous converter by a bus; and
   the asynchronous transfer mode switch connected to two universal test and operations interfaces for ATM (UTOPIA) portions of the processor group by two asynchronous transfer mode switch buses;
   wherein time division multiplexed information received at one of the first set of connection points is communicated to the synchronous-asynchronous converter where the time division multiplexed information is converted into asynchronous transfer mode information, then the information is communicated to the asynchronous transfer mode switch from which the asynchronous transfer mode information is communicated by the asynchronous transfer mode output bus to the third set of the plurality of connection points.

2. The line card of claim 1 wherein the backplane PCI bus is a compact PCI bus.

3. The line card of claim 1, wherein one of the first set of connection points, one of the second set of connection points and one of the third set of connection points are terminals of a slot for connection with an electronic card to provide better functionality.

4. The line card of claim 3, wherein the electronic card connects to a PCI bus having a clock rate of at least 33 megahertz.

5. The line card of claim 3, wherein the electronic card is a mezzanine card.

6. The line card of claim 1, wherein:
   one of the first set of connection points, one of the second set of connection points and one of the third set of connection points are terminals of a slot for connection with an electronic card; and
   a digital signal processing electronic card is connected to the slot to provide signal processing of asynchronous transfer mode information.

7. The line card of claim 1, wherein:
   one of the first set of connection points, one of the second set of connection points and one of the third set of connection points are terminals of a slot for connection with an electronic card;
   a digital signal processing electronic card is connected to the slot; and
   a public switched telephone network is connected to the digital signal processing electronic card;
   the public switched telephone network communicates information to and from the digital signal processing electronic card in frames.

8. The line card of claim 7, wherein:
   the digital signal processing electronic card performs enhanced variable rate codec processing on the frames and places the processed frames on the time division multiplex bus; and
   the frames are then transferred from the time division multiplex bus to the bus interface unit and subsequently to the asynchronous transfer mode switch;
   the frames are then sent from the asynchronous mode switch to the T1/E1 interface card through the asynchronous transfer output bus.

9. The line card of claim 8, wherein the T1/E1 interface card connects to the public switched telephone network and communicates frame information to the public switched telephone network.

10. The line card of claim 1, wherein:
    the bus interface receives frames of voice communications from the asynchronous transfer mode backplane bus from an external network and converts the frames of information into a format compatible with the line card; the processed frames are transferred to the asynchronous transfer switch by the UTOPIA portions of the processor group;
    the UTOPIA portion of the processor group provides additional processing of the frames and communicates the twice processed frames to the processor portion of the processor group;

the processor portion of the processor group transfers the twice processed frames to the digital signal processor through the local bridge;

the digital signal processor performs enhanced variable rate codec processing of the twice processed frame information and thereby provides a three times processed frames of information; and the three times processed frames of information are communicated through the asynchronous transfer mode switch to a T1/E1 converter electronic card which completes the processing of the frames of information and communicates them to the public switched telephone network.

11. The line card as recited in claim 10 wherein the frames of information carried multimedia information.

12. The line card as recited in claim 10 wherein the frames of information carried multimedia information and the multimedia information was a voice.

13. The line card as recited in claim 10 wherein the frames of information carried multimedia information and the information was video.

14. The line card as recited in claim 10 wherein the frames of information carried multimedia information and the information was data.

15. The line card as recited in claim 1 further comprising: an interface circuit for providing an interface between high speed applications, wherein the high speed applications comprise of asynchronous transfer mode, ethernet and frame relay.

* * * * *